(12) United States Patent
Kamenz et al.

(10) Patent No.: US 8,954,930 B2
(45) Date of Patent: Feb. 10, 2015

(54) SYSTEM AND METHOD FOR REDUCING TEST EFFORT BY OBJECT RISK ANALYSIS

(75) Inventors: Torsten Kamenz, Wiesloch (DE); Andreas Kemmler, Boenigheim (DE)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 12/971,731

(22) Filed: Dec. 17, 2010

(65) Prior Publication Data
US 2012/0159443 A1 Jun. 21, 2012

(51) Int. Cl.
G06F 9/44 (2006.01)
G06F 11/00 (2006.01)
G06F 11/36 (2006.01)

(52) U.S. Cl.
CPC .................................. *G06F 11/368* (2013.01)
USPC ........................... 717/124; 717/126; 714/38.1

(58) Field of Classification Search
None
See application file for complete search history.

(56) References Cited

U.S. PATENT DOCUMENTS

| | | | |
|---|---|---|---|
| 6,880,149 B2* | 4/2005 | Cronce | 717/126 |
| 7,028,290 B2* | 4/2006 | Srivastava et al. | 717/124 |
| 7,490,319 B2 | 2/2009 | Blackwell et al. | |
| 7,506,312 B1 | 3/2009 | Girolami-Rose et al. | |
| 7,716,641 B2* | 5/2010 | McHugh et al. | 717/124 |
| 7,747,987 B1* | 6/2010 | Akarte et al. | 717/131 |
| 7,823,132 B2* | 10/2010 | Ulrich et al. | 717/126 |
| 7,934,201 B2* | 4/2011 | Sweis | 717/124 |
| 8,336,030 B1* | 12/2012 | Boissy | 717/126 |
| 8,522,083 B1* | 8/2013 | Cohen et al. | 714/38.1 |
| 2003/0204836 A1* | 10/2003 | Srivastava et al. | 717/124 |
| 2004/0078693 A1* | 4/2004 | Kellett | 714/38 |
| 2004/0193961 A1* | 9/2004 | Zheng et al. | 714/38 |
| 2005/0166094 A1* | 7/2005 | Blackwell et al. | 714/38 |
| 2006/0184918 A1* | 8/2006 | Rosaria et al. | 717/124 |
| 2007/0094542 A1 | 4/2007 | Bartucca et al. | |
| 2008/0306752 A1* | 12/2008 | Wagner et al. | 705/1 |
| 2009/0125876 A1* | 5/2009 | Bixon et al. | 717/101 |

OTHER PUBLICATIONS

Karhu et al.Empirical Observations on Software Testing Automation, International Conference on Software Testing Verification and Validation, 2009, pp. 201-209, Retrieved on [Sep. 12, 2004], Retrieved from the Internet:URL<http://ieeexplore.ieee.org/xpls/abs_all.jsp?arnumber=4815352&tag=1>.*

(Continued)

*Primary Examiner* — Thuy Dao
*Assistant Examiner* — Cheneca Smith
(74) *Attorney, Agent, or Firm* — Kenyon & Kenyon LLP

(57) ABSTRACT

A system, computer readable medium, and method for automatically testing computer objects affected by an update package. The exemplary method may compare computer objects/instances in an update package with those of the installed version of the computer application. A set of computer objects that have changed in the update package as compared to the installed version may be generated. The changes to each of the computer objects in the set of changed objects may be analyzed to determine if an automated test is related to the changed object. If an object has a related automated test assigned to it, the object may be placed in a separate list for testing. The automated tests of the changed objects in the separate list may be organized into a test plan. The automated tests may be executed according to the test plan. The system may have servers and computer processors to implement the method.

15 Claims, 4 Drawing Sheets

(56) References Cited

OTHER PUBLICATIONS

Pretschner et al. One Evaluation of ModelBased Testing and its AutomationProceedings of the 27th international conference on Software engineering, 2005, pp. 392-401, Retrieved on [Sep. 12, 2014], Retrieved from the Internet: URL<http://dl.acm.org/citation.cfm?id=1062529>.*

European Search Report for EP 11 00 5876, dated Nov. 2, 2011.

Lyu, Michael. R., "Software Reliability Engineering: A Roadmap", Future of Software Engineering, 2007, pp. 153-170.

Huang, Chin-Yu, et al., "Optimal Release Time for Software Systems Considering Cost, Testing-Effort, and Test Efficiency", Transactions on Reliability, vol. 54, No. 4, 2005, pp. 583-591.

* cited by examiner

100

200

400

continues on following page…

SYSTEM AND METHOD FOR REDUCING TEST EFFORT BY OBJECT RISK ANALYSIS

RELATED APPLICATION

The present application is related to commonly-assigned, co-pending U.S. patent application Ser. No. 12/847,211, the entire contents of which are incorporated herein by reference.

BACKGROUND

A factor in the total cost of ownership (TOC) in the life-cycle of a software application is the testing of changes to software applications (e.g., regression tests). Typically, whenever an update is made to a software application, the various processes supported by the software application are checked for consistency (e.g., checked for possible coding conflicts between processes that provide the functionality of the software application). Examples of updates may include software patches, support packages, enhancement packages (i.e., new versions of the installed software), modifications of the software, or the addition/modification/deletion of separate customer software running in the same system (e.g., software of another vendor).

A software application may generate during execution a collection of data that may affect computer objects that provide functionality or data to the various processes. For example, the generated data may cause run-time errors, system errors and the like. Risk of errors and faults may arise whenever a software application is modified. In order to ensure the correctness of the running processes, it may be necessary to perform and repeat tests on the processes of the software application. Each repeated test (e.g., after each modification) may need to be performed on the entire system, which may be an extremely time and resource consuming operation. Alternatively, risk-based subsets of the processes may be defined, and the tests may be directed to only some of the subsets (e.g., "core functions") of the processes. However, these risk-based subsets typically only relate to the processes known to be critical, with no regard for what computer objects were or were not affected by the modification. For example, many computer objects may be negatively affected (i.e., may cause run-time errors and failures), but belong to processes deemed less critical, and therefore may not be tested. Further, many computer objects may be wholly unaffected by a change, yet belong to a "core function," and thus may be needlessly tested. A critical process can be a process which would cause a severe impact on the customer's core business if it is not running as expected.

There already exist analysis tools capable of determining what computer objects are affected by which processes. Known analysis tools, such as the Business Process Change Analyzer™, which is part of the SAP® Solution Manager™ application, may compile a list of associations between the various computer objects and various processes, for example, as described in the above referenced, commonly-assigned, co-pending application. The above referenced related application may include embodiments that provide calculations of regression test scope that optimizes the test effort by reviewing criticality attributes of the computer objects and processes affected by the update packages.

The inventors have recognized the need for tool that provides automated testing in response to the identification of different criticality attributes of the affected computer objects and processes.

DETAILED DESCRIPTION

Embodiments provide a method for automatically testing computer objects affected by an update package. The exemplary method may compare computer objects in an update package with those of the installed version of the computer application. A set of computer objects that have changed in the update package as compared to the installed version may be generated. The changes to each of the computer objects in the set of changed objects may be analyzed to determine if an automated test is related to the changed object. If an object has a related automated test assigned to it, the object may be placed in a separate list for testing. The automated tests of the changed objects in the separate list may be organized into a test plan. The automated tests may be executed according to the test plan.

Figure 1:
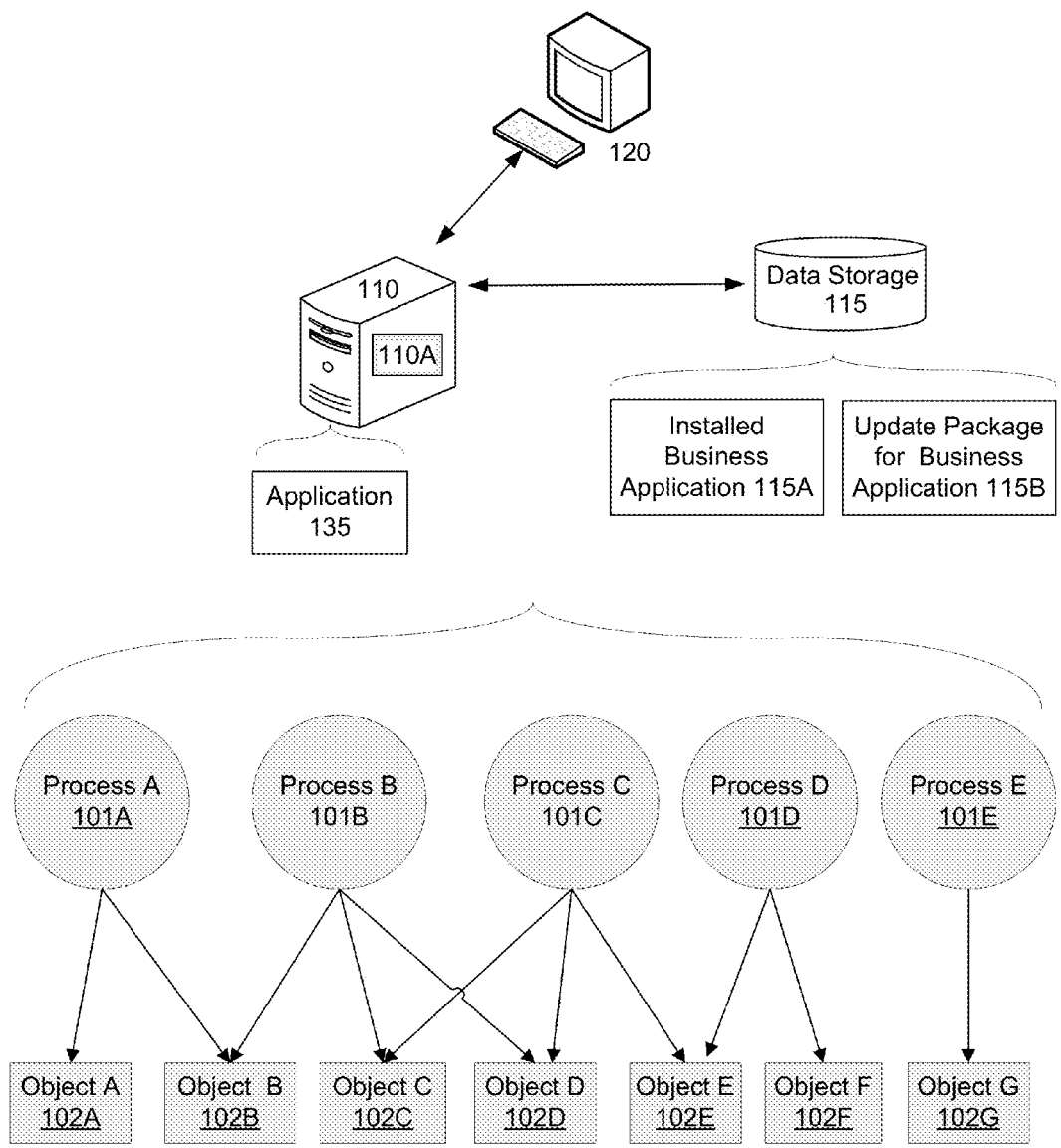
FIG. 1 is an illustration of data structures related to example embodiments of the present invention.

FIG. 1 is an illustration of data structures related to and system for implementing exemplary embodiments of the present invention. The system 100 may include a server 110, a terminal 120, and a data storage 115. A computer application 135 executing on a processor 110A within the server 110. The application 135 may provide a tool for analyzing the updates made in an update package to an existing computer application, such as an enterprise resource management or customer relationship management application. The tool provided by application 135 may analyze the processes 101A-101E to determine if a computer object such as 102A-102G may have changed with the latest update package. Each process 101A-101E, e.g., a set of organized steps and/or functions that define some business operation, may have a computer object 102A-102G that has a specification or definition to describe the functionality associated with the respective step in the business operation. Each process 101A-101E, in order to facilitate the various defined steps of the process, may call upon one or more software computer objects 102A-102G to perform the functional work of the particular steps of the respective process. Each process 101A-101E may also have a criticality rating to specify the importance of that process to the organization running the updated software. The criticality rating may, for example, be assigned to each of the processes and/or computer objects assigned to the respective process. This may be based on user input, statistical analysis, vendor designation, or any number of other sources. Any process dependencies may be identified and organized to maximize efficiency of test execution. A global criticality level may also be specified. The criticality rating may be defined by the user, automatically determined, or a combination of both. For example, a user may specify a level of criticality (e.g., essential, important, frequently used, lower importance, rarely used, or the like). Further, the system may, for example, log usage rates for the various processes and associated computer object(s), and base a criticality level on this and/or other automatically recorded metrics, such as whether. Usage of a computer object may, for example, be based on how often an object is involved in corrections or how often the object is extended by industry solutions, or many different business processes are based on the object. Using these additional recorded metrics, the application 135 may then establish or modify the criticality level, or may be shown to the user via a graphical user interface (not shown) on the terminal 120, to help the user accurately specify the criticality level.

In addition to identifying the criticality level of each process 101A-101E and computer object 102A-102G, a separate list of processes and/or computer objects affected by a change may be compiled. For example, in FIG. 1, an example update, stored in the data storage 115 may, for example, alter the functionality of computer object 102A and computer object 102D. The exemplary update package may include a list of the computer objects, e.g., 102A and 102D, which are modified by the update package, or a list may be automatically constructed by the application 135 after analyzing the update. Once there is a list of computer objects that are modified (e.g., 102A and 102D), a list of processes 101A-101E affected may be constructed. In the example, computer object 102A may only be used by process 101A, so process 101A may be added to the list and no other with regard to computer object 102A. Computer object 102D is used by process 101B and process 101C, which are therefore both added to the separate list of potentially affected processes. This separate list may then define the total set of processes and computer objects that are to be tested. In other example embodiments, a list of affected computer objects may be determined. For example, here, computer objects 102A to 102E are all within the test scope, since the potentially affected processes 101A to 101C use each of them. It may be noted that computer objects 102B, 102C, and 102E are known to work properly, since these computer objects were not modified in any way. However, they may ought to be tested in the context of the processes, e.g., 101A that included a modified computer object, to ensure they still function as expected, within the context of the overall processes. The list may also limit testing to the relevant processes, e.g., those processes that call a changed computer object.

Figure 2:
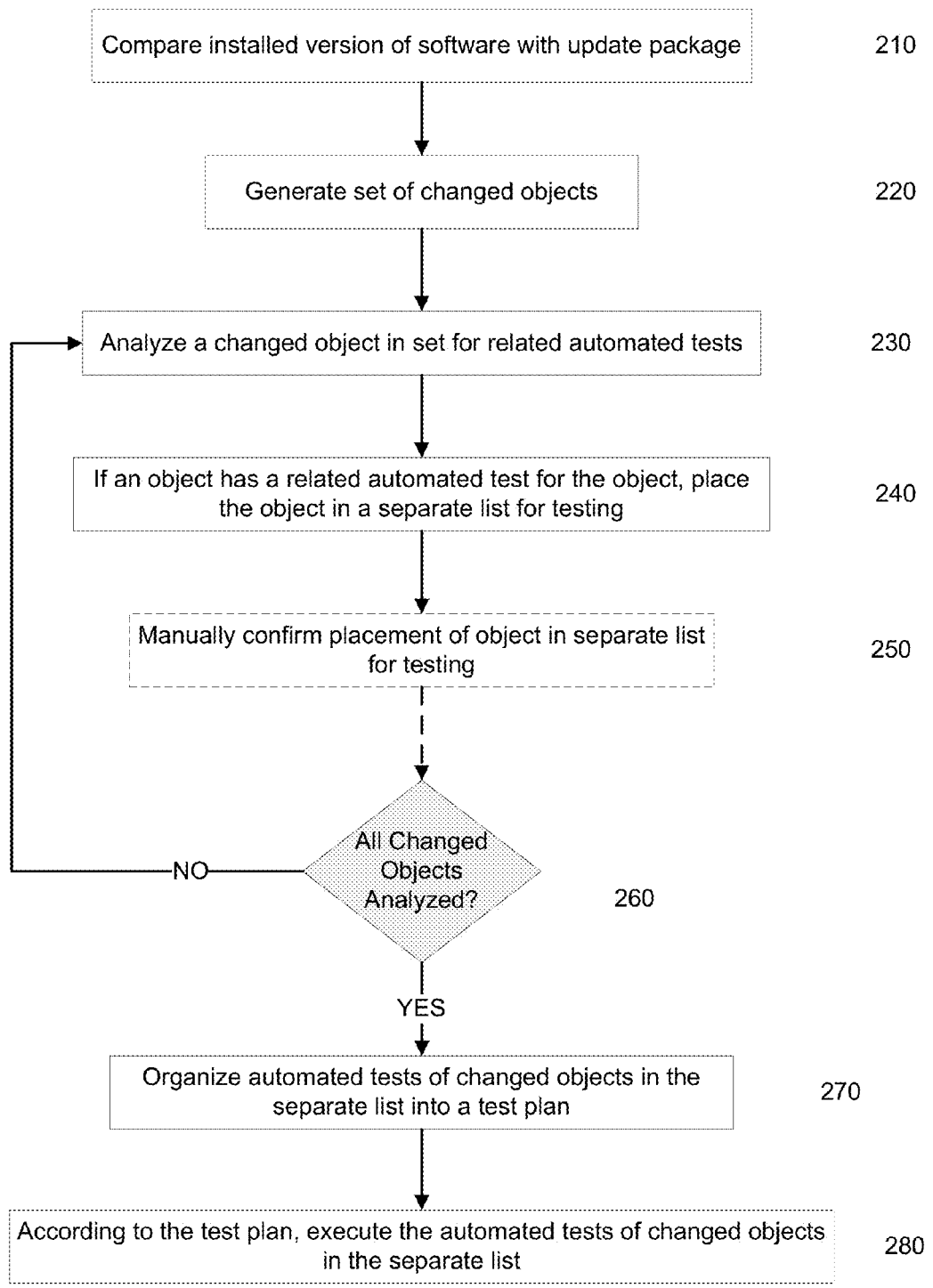
FIG. 2 illustrates a flowchart of an exemplary process according to an embodiment of the present invention.

The process of compiling the list may be described in more detail with reference to FIG. 2. FIG. 2 illustrates a flowchart of an exemplary process according to an embodiment of the present invention. The process 200 may include, at step 210, comparing the processes and computer objects of the update package to those in the installed version.

As explained above, the system may identify computer objects that have been changed and the extent of the change to the computer object. For example, the update to a computer object in the update package may simply be additional developer comments that are required, for example, for quality assurance purposes. The comments may in no way affect the operation of the computer object. Testing of this updated, or changed, object may not be necessary. Accordingly, the computer object with only comment changes may not be flagged as changed. Meanwhile, another computer object may have extensive updates that affect the functionality of the computer object. This object may be flagged as an updated computer object in comparison to the installed version of the computer application. Alternatively, the flagging of a computer object may be determined by the type of the computer object. For example, computer objects may have a type, such as data or coding, which may indicate that the object interacts with other objects or not at all. Other types may be, for example, text or messages to be presented to the end-user, data dictionary objects (i.e. definitions of meta data), or user interface metadata that may describe how an end-user screen may look. If the object is of the type that does not interact and changes to it do not adversely affect other objects, then testing of the object may be unnecessary. Additionally, the object instance may be relevant to whether a computer object should be selected for automated testing. For example, an object instance may be the current object itself, and not it's type. Depending on the usage of the object in the context of the application, any change to the object might be uncritical. The criticality of the object may be determined by the usage of the objects (number of usages), the type of usages (e.g. in how many different processes the object is used or by how many industry solutions the object is extended, and the context on which they are used (critical or uncritical process).

The updated computer objects that are flagged by the system may be added, at step 220, to a set of changed objects that may be generated by the process 200. Either as the computer objects are added to the set of changed objects, or after all changed objects have been added to the set of changed objects, at step 230, the changed objects in the generated set may be analyzed to determine if an automated test is related to the specific changed object. An automated test may be related directly to the changed computer object, or may be related to the changed object because the specific changed object under analysis is dependent upon another changed object that has a directly related automated test. Alternatively, or, in addition, the changed object may be analyzed based on criticality. Criticality may have criteria such as, for example, the type of object, the specific object instance and the type of change which has been applied to the specific object, that is analyzed. An example of an object type may be source code objects that may be more critical than documentation objects. An example of an object instance (i.e., usage) may be a specific source code object which may be used by only a very few processes. This specific source code object may not be considered as critical as a source code object that is used by many business processes. Another may be a type of change, such as a change to a source code object where only some comments are added. This type of change may not be as critical as a change, for example, where a large number of lines of code are replaced. Upon a determination that the computer object does not have an automated test related to it, the computer object may be deleted, at step 240, from the set of changed objects. The deletion of the changed object from the set of changed objects may, optionally, at step 250, be confirmed by a graphical user interface that receives a confirmatory input by a user. At step 260, it is determined if all changed objects in the set of changed objects have been analyzed. If not, the process returns to step 240, to analyze the next changed object in the set of changed objects. Otherwise, the process continues to step 270, where the automated tests for the set of changed objects are organized into an efficient test plan, and, at step 280, the tests are executed according to the test plan so that the computer objects and related processes are tested automatically by the system. Although, the process 200 is explained with a concentration on determining whether an automated test exists for all relevant objects and performing all these tests. In addition, all relevant objects which have to be tested but which are not covered by an automated test need to be still included in a list, and have to be tested "manually" by testing the effected processes. So at the end there may be two lists of tests created: the automated tests which cover one part of the changed objects, and a list of processes which need to be tested manually to cover the other part of the objects. Although described with reference to computer objects, the process 200 may be applied to computer processes, such as processes 101A-101E of FIG. 1, for example.

Figure 3:
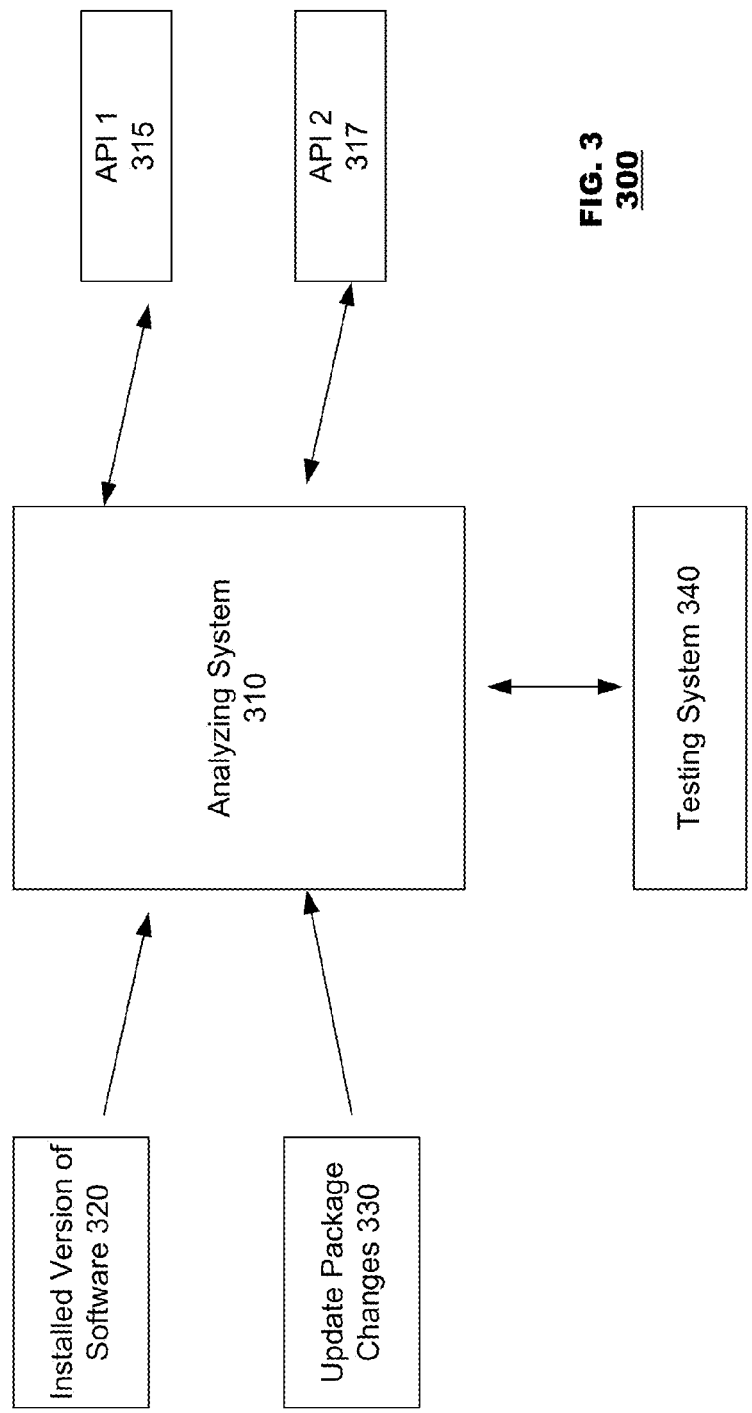
FIG. 3 is another example procedure, according to an embodiment of the present invention.

Modification to current analysis systems may require the addition of application programming interfaces (API) to allow the evaluation of the computer objects and automatic object tests. As illustrated in FIG. 3, the system 300 may include the analyzing application 310 and application programming interfaces API1 and API2. The analyzing application 310 may receive as inputs data, such as a list of attributes, related to each of the computer objects and processes of the installed version of the software 320 under analysis, and data, such as a list of attributes or change flags, related to each of the computer objects and processes of the update package 330 for the software. The analyzing application 310 may process the data from the installed version 320 and the update package 330. The analyzing application 310 may call an API during the analysis of the update package. For example, API 1 315 may be hosted in a server and upon execution of the analysis step 230 in FIG. 2, may determine if one of more automated tests are related to, or assigned, to the computer object under analysis. The API 1 315 may use an object identifier to identify whether any automated tests are related to the computer object, and return an indication, for example, of true, if a related automated test is available, or false, if an automated test is not available for the computer object. The computer objects identified as having a related automated test may be stored in a list. The list of computer objects to be tested may be turned over to a test management tool. The list may be provided via another API, API 2 317 that retrieves the list of objects and triggers the test of these objects by a test system 340 connected to the analyzing application 310. The list of computer objects may be the input for the API 2 317 from the analyzing application 310, and the API 2 317 may receive the results of the tests via the analyzing application 310 from the test system 340.

The tests triggered by API 2 may comprise either a unit test or a full test context, which tests are administered may be dependent on the object type. Unit tests provide a very simple test of objects with a clear interface (e.g., function modules). In more detail, an unit test may be referring to an object with a clearly defined interface and no side-effects when tested. So, the object can be, for example, tested automatically by providing a set of input parameters, executing the object and checking whether the output matches the expected output. When an object is referring to its contexts during execution (e.g. any state of data in a database) a simple unit test may not be feasible. Alternatively, the full test context framework may fully simulate the context in which the object is normally executed.

Figure 4:
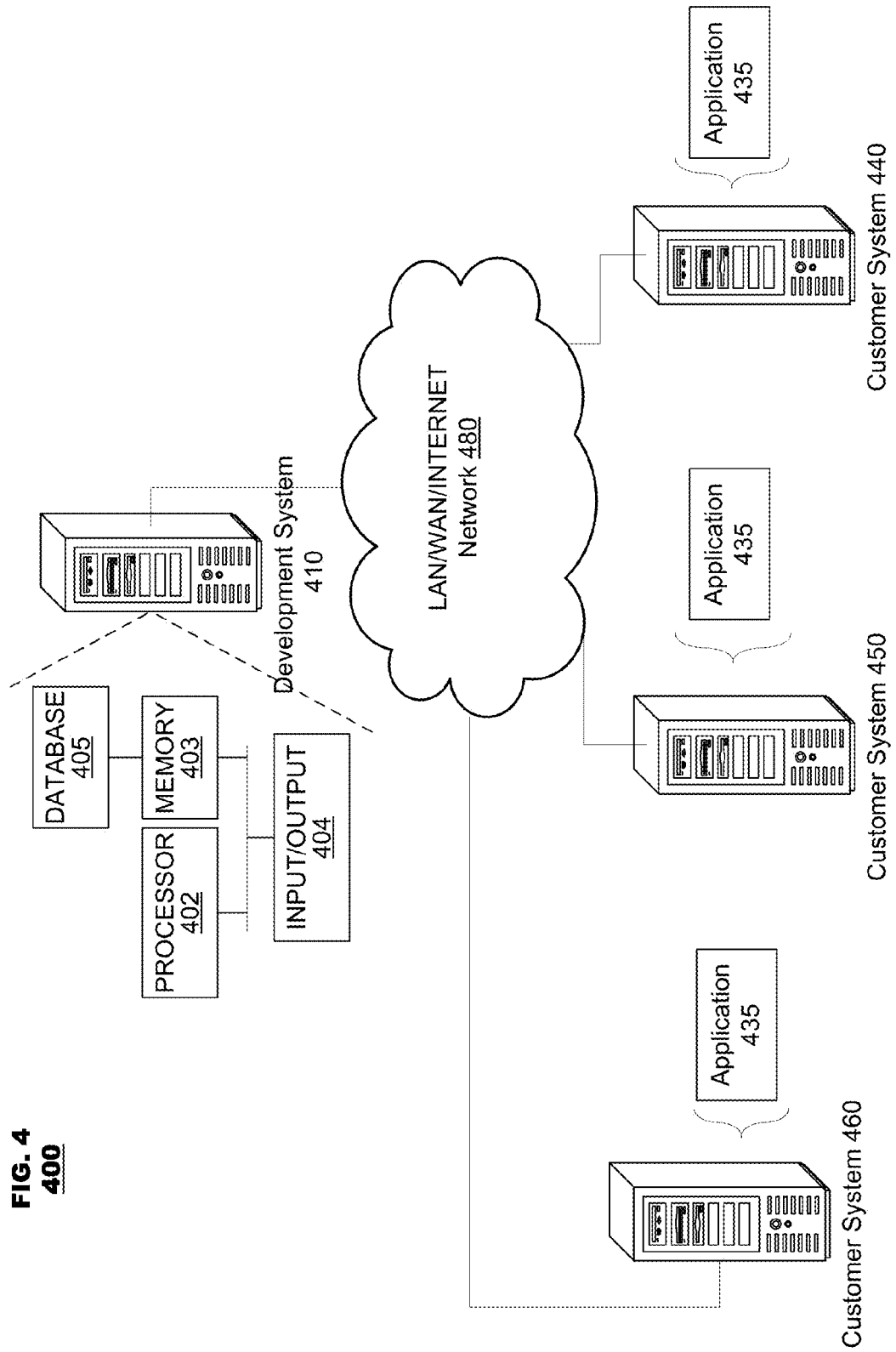
FIG. 4 is an example system, according to an embodiment of the present invention.

FIG. 4 illustrates an exemplary system, according to an example embodiment of the present invention. The example may include one or more server computer systems, e.g., development system 410. This may be one server, a set of local servers, or a set of geographically diverse servers. Each server may include a computer processor 402, one or more sets of memory 403, including database repositories 405, and various input and output devices 404. These too may be local or distributed to several computers and/or locations. Any suitable technology may be used to implement embodiments of the present invention, such as general purpose computers. These system servers may be connected to one of more customer system 440 to 460 via a network 480, e.g., the Internet. One or more system servers may operate hardware and/or software modules to facilitate the inventive processes and procedures of the present application, and constitute one or more example embodiments of the present invention. For example, each of customer systems 440-460 may host and execute application 435. Application 435 may provide the functionality described with respect to FIGS. 1-3. Further, one or more servers may include a computer readable medium, e.g., memory 403, with instructions to cause a processor, e.g., processor 402, to execute computer program instructions for providing application 435 according to one or more example embodiments of the present invention.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for automatically testing computer objects affected by an update package, comprising:
    comparing computer objects in an update package with those of the installed version of the computer application;
    generating a set of computer objects that have changed in the update package as compared to the installed version;
    analyzing each of the computer objects in the set of changed objects to determine if an automated test is related to the changed object;
    placing objects in a first list for automated testing, if an object has a related automated test assigned to it;
    placing objects in a second list for process testing, if an object does not have a related automated test assigned to it;
    removing objects from the first and second list based on a type of change made to the objects;
    organizing the automated tests for the remaining changed objects in the first list into a test plan;
    executing the automated tests for the remaining changed objects according to the test plan;
    determining a set of processes that are effected by the remaining changed objects in the second list and executing tests on the set of processes;
    identifying a criticality level of each computer object, each criticality attribute specifying its relative importance; and
    adjusting at least one of the criticality attributes such that test time for one or more relevant computer objects is reduced to a value less than a predetermined time.

2. The method of claim 1, where the criticality level is further based on the object type.

3. The method of claim 1, where the criticality level is further based on the object instance usage.

4. The method of claim 1, where the criticality level where the criticality level is further based on the type of change.

5. The method of claim 1, further comprising:
    incorporating processes relevant to the computer objects in the first list, wherein the list of relevant processes is defined by which processes call a computer object that has been changed.

6. A non-transitory computer-readable medium embodied with computer program instructions for causing a computer to execute a method, comprising:
    comparing computer objects in an update package with those of the installed version of the computer application;
    generating a set of computer objects that have changed in the update package as compared to the installed version;
    analyzing each of the computer objects in the set of changed objects to determine if an automated test is related to the changed object;
    placing objects in a first list for automated testing, if an object has a related automated test assigned to it;
    placing objects in a second list for process testing, if an object does not have a related automated test assigned to it;
    removing objects from the first and second list based on a type of change made to the objects;

organizing the automated tests for the remaining changed objects in the first list into a test plan;

executing the automated tests for the remaining changed objects according to the test plan;

determining a set of processes that are effected by the remaining changed objects in the second list and executing tests on the set of processes;

identifying a criticality level of each computer object, each criticality attribute specifying its relative importance; and adjusting at least one of the criticality attributes such that test time for one or more relevant computer objects is reduced to a value less than a predetermined time.

7. The non-transitory computer readable medium of claim 6, where the criticality level is further based on the object type.

8. The non-transitory computer readable medium of claim 6, where the criticality level is further based on the object instance usage.

9. The non-transitory computer readable medium of claim 6, where he criticality level is further based on the type of change.

10. The non-transitory computer-readable medium of claim 6, further comprising:

incorporating processes relevant to the computer objects in the first list, wherein the list of relevant processes is defined by which processes call a computer object that has been changed.

11. A system for increasing software testing efficiency, comprising:

a display device for presenting a graphical user interface and data;

a storage device for storing data; and a processor configure to:

compare computer objects in an update package with those of the installed version of the computer application;

generate a set of computer objects that have changed in the update package as compared to the installed version;

analyze each of the computer objects in the set of changed objects to determine if an automated test is related to the changed object;

place objects in a first list for process testing, if an object has a related automated test assigned to it;

place objects in a second list for manual testing, if an object does not have a related automated test assigned to it;

remove objects from the first and second list based on a type of change made to the objects;

organize the automated tests for the remaining changed objects in the first list into a test plan;

execute the automated tests for the remaining changed objects according to the test plan;

determine a set of processes that are effected by the remaining changed objects in the second list and execute tests on the set of processes;

identify a criticality level of each computer object, each criticality attribute specifying its relative importance; and adjust at least one of the criticality attributes such that test time for one or more relevant computer objects is reduced to a value less than a predetermined time.

12. The system of claim 11, wherein the criticality level is further based on the object type.

13. The system of claim 11, wherein the criticality level is further based on the object instance usage.

14. The system of claim 11, where the criticality level is further based on the type of change.

15. The system of claim 11, the processor further configured:

incorporate processes relevant to the computer objects in the first list, wherein the list of relevant processes is defined by which processes call a computer object that has been changed.

* * * * *